(12) United States Patent
Takashima et al.

(10) Patent No.: US 6,257,562 B1
(45) Date of Patent: Jul. 10, 2001

(54) LIQUID FILLED VIBRATION ISOLATING DEVICE

(75) Inventors: Yukio Takashima; Tsutomu Hashimoto, both of Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 09/456,874

(22) Filed: Dec. 8, 1999

(30) Foreign Application Priority Data

Dec. 11, 1998 (JP) ................................. 10-352404

(51) Int. Cl.[7] ............................................. F16F 7/00
(52) U.S. Cl. .............................. 267/141.1; 267/140.13; 267/219
(58) Field of Search ................ 267/140.11, 140.13, 267/140.4, 141, 141.1, 141.4, 141.5, 219, 292

(56) References Cited

U.S. PATENT DOCUMENTS

| | | | |
|---|---|---|---|
| 4,657,227 | * | 4/1987 | Hofmann .............................. 267/140.1 |
| 4,671,227 | * | 6/1987 | Hollerweger et al. ............. 123/192 R |
| 4,693,455 | * | 9/1987 | Andra ................................. 267/140.1 |
| 4,787,609 | | 11/1988 | Dan et al. . |
| 4,928,935 | | 5/1990 | Matsui . |
| 5,028,038 | * | 7/1991 | De Fontenay ..................... 267/140.1 |
| 5,028,039 | | 7/1991 | Sato . |
| 5,031,884 | * | 7/1991 | Baudrit et al. ..................... 267/140.1 |
| 5,035,407 | | 7/1991 | Takeguchi et al. . |
| 5,094,433 | * | 3/1992 | Dan et al. ........................... 267/140.1 |
| 5,178,374 | * | 1/1993 | Maeno ............................. 267/140.13 |
| 5,738,343 | * | 4/1998 | Nakajima et al. .................... 267/219 |
| 5,897,092 | | 4/1999 | Mizutani et al. . |
| 6,158,724 | * | 12/2000 | Takashima et al. ............. 267/140.13 |

FOREIGN PATENT DOCUMENTS

| | | |
|---|---|---|
| 59-157137 | 10/1984 | (JP) . |
| 9100866 | 4/1997 | (JP) . |
| 09100866 | * 4/1997 | (JP) ..................................... 267/219 |
| 9210117 | 8/1997 | (JP) . |

OTHER PUBLICATIONS

U.S. application No. 09/257,422 Takashima et al., filed Feb. 25, 1999.

* cited by examiner

*Primary Examiner*—Douglas C. Butler
*Assistant Examiner*—Devon Kramer
(74) *Attorney, Agent, or Firm*—Jordan and Hamburg LLP

(57) ABSTRACT

A liquid filled vibration isolating device which is excellent in reliability, functionality, mounting and assembly of products is provided. A partitioner 7 has a three member constitution consisting of an upper-partitioner member 26, a lower partitioner member 27 and an elastic member 28. An outer peripheral end portion of the lower partitioner member 27 is extended outwardly in a radial direction and only an extended portion 29 is fixedly secured to a mounting metal fitting of a vibration isolating device body by caulking, and an upper end outer peripheral portion of the upper partitioner member 26 is pressed onto a notched portion 30 at a liquid-chamber-side outer periphery of a vibration isolating base body 4 and then positioned there thus facilitating assembling of products while assuring reliability, functionality and mounting.

11 Claims, 8 Drawing Sheets

LIQUID FILLED VIBRATION ISOLATING DEVICE

BACKGROUND OF THE INVENTION

This invention relates to a liquid filled vibration isolating device mainly used for supporting a vibration generating body such as an engine of an automobile.

The liquid filled vibration isolating device supports a vibration generating body such as an engine of an automobile while preventing the transmission of the vibration of the vibration generating body to a vehicle body or the like. It is known a type of liquid filled vibration isolating device which is constructed such that; a partitioner is provided for dividing a liquid chamber in a vibration isolating device body into a main liquid chamber and a sub liquid chamber; and an orifice which communicates the main liquid chamber with the sub liquid chamber is formed in the partitioner; and the vibration attenuating function is achieved by the effect of flowing of liquid in the liquid chambers through the orifice. Furthermore, recently, a double-orifice-type of liquid filled vibration isolating device is. known which has two orifices in the partitioner for attenuating the vibrations of different frequencies has been known.

For example, JP-A-09100866 (Japanese Patent Publication, unexamined, 9-100866(1997)), hereinafter referred to Prior art 1, proposes a vibration isolating device where an upper side of first partition member on a main liquid-chamber-side is covered with second partition member which adheres a sub diaphragm thereto by vulcanization, so as to define a third liquid chamber in an inner portion of the partition members; and a second orifice is formed to communicate with the third liquid chamber; whereby one orifice passage is for preventing low-frequency shake vibrations while another orifice passage in for preventing high-frequency idle vibration.

Furthermore, JP-A-09210117 (Japanese Patent Publication, unexamined, 9-210117(1997)), herein after referred to Prior art 2, proposes a vibration isolating device where a sheet of elastic member which is formed by vulcanization is clamped between a partition member and a restricting member defining a sealed air chamber, thus constituting two diaphragms of different modulus of elasticity from a sheet of elastic member; and between the partition member and these diaphragms, a liquid chamber which is communicated with an orifice formed in an outer peripheral portion of the partition member and a second liquid chamber which is communicated with a second orifice formed in an inner portion of the partition member are defined so that the vibration isolating device can cope with the vibration of wide frequency band such as the shake vibration and the idle vibration.

In such double-orifice liquid filled vibration isolating devices, particularly, the length and the cross sectional area of the orifice formed in the partitioner, and furthermore, the modulus of elasticity of both diaphragms become important parameters for achieving a given vibration attenuating function. The durability and the sealing ability to maintain this vibration attenuating function also become important. Furthermore, the easiness of assembling the partitioner to a vibration isolating device body must be taken into account.

From this viewpoint, the inventors have reviewed the reliability,.the easiness of mounting (shape and size of caulking portions), the functionality, and the easiness of assembling of products of the Prior arts 1 and 2. With respect to the Prior art 1, the vibration isolating device is constructed such that the lower partitioner member is fitted into the bowl-shaped upper partitioner member which opens downwardly; and orifices defined by these upper and lower partitioner members are respectively formed in the outer-peripheral side and the inner side of the lower partitioner member. Accordingly, there arises a problem with respect to the maintenance of the sealing ability of the orifices. Furthermore, the high accuracy of dimension of the upper and lower partitioner members is required.

On the other hand, with respect to the Prior art 2, two diaphragms which differ in the modulus of elasticity are formed of one elastic member so that, at the time of assembling, it is necessary to pay an attention to the shape of the caulking portion so as to prevent the dimensional variation or dimensional tolerance between the elastic member and the partition member from becoming large and hence, the caulking operation becomes difficult. Furthermore, in case the dimensional variation or dimensional tolerance becomes large, it gives an adverse effect to the cross sectional area of the orifices and the modulus of elasticity of the diaphragms thus living rise to problems which affects the functionality of the equipment.

BRIEF SUMMARY OF THE INVENTION

In view of the above, the inventors have vigorously made a research on a vibration isolating device, particularly on the structure of a partitioner thereof which can meet the reliability, the functionality, the easiness of mounting and the easiness of assembling of products, and have found that by adopting following constitution: a partitioner has basically a three member construction which consists of an upper partitioner member, a lower partitioner member and an elastic member; and the lower partitioner member has an outer peripheral portion thereof extended outwardly in a radial direction; and only such an extended portion is fixedly secured to a mounting metal fitting of a vibration isolating device body by caulking; and the upper side partitioning member has an upper-end outer peripheral portion, thereof pressed onto a liquid-chamber-side outer peripheral end portion of a vibration isolating base body. At the time of assembling the partitioner, by only pushing the upper partitioner member into the body along a thin film portion of the body until the upper partitioner member comes into contact with an outer peripheral portion of the vibration isolating base body in the condition that the body is held in a liquid vessel in an up-side-down posture, and subsequently placing the lower partitioner member on the upper partitioner member from above and fixedly securing the extended portion of the lower partitioner member to the mounting metal fitting by caulking, the reliability, the functionality and the easiness of mounting of the products can be assured and the products can be easily assembled.

In case a first orifice groove of a U-shaped cross section which has a peripheral side face portion opened is formed in the upper partitioner member and the upper partitioner member is pushed into the equipment body along the thin film portion of the equipment body, a first orifice can be readily formed at a space portion surrounded by the first orifice groove and the thin film portion and furthermore, the first orifice can have a desired cross sectional area.

Such an upper partitioner member may be obtained by subjecting a sheet of metal plate material to drawing or the like so as to form an orifice groove formed in an outer peripheral portion thereof. However, in view of obtaining a desired cross sectional area and shape, an integrally molded product is preferable. The upper partition member may be formed of either metal (aluminum, for example) or synthetic resin.

When the lower partitioner member is a flat-plate like member which closes the second orifice groove opened downwardly at the inner side of the upper partitioner member from downside is, following advantages is achieved: the assembling is facilitated; and an additional or separate step for press-fitting the partition member; and a special tool for expelling entrained residual air becomes unnecessary. Furthermore, since the partitioner is constructed such that it is pressed toward the vibration isolating base body by fixedly securing the lower partitioner member by caulking, the reliability of the product is assured even when the vibration isolating base body is deteriorated as time elapses.

In case the first orifice is made thin and long while the second orifice is made thick and short, the level difference or stepped portion may give arise between the lower surfaces of the first and second orifice groove forming members, due to the difference of height between the cross sections of the orifices. Even in such a case, by forming a protrusion which presses the lower surface of the upper partitioner member on the outer peripheral portion of the lower partitioner member, the partitioner can be favorably positioned and secured.

Furthermore, in case the elastic member is constructed such that it includes at least a second diaphragm separately from a first diaphragm while this second diaphragm is disposed at the inner side of the upper partitioner member, it is unnecessary to secure the elastic member to the mounting metal fitting by caulking as in the case of the Prior art 2 so that the diaphragm having a desired modulus of elasticity can be molded and maintained.

Here, the second orifice groove may be formed by either one or the combination of the upper partitioner member, the lower partitioner member and the elastic member, in the above-mentioned basic constitution. However, since the constitution that the partitioner is positioned by fixedly securing only the lower partitioner member by caulking in adopted, the lower partitioner member is formed in a simple flat plate shape while the second orifice groove is formed on either the upper partitioner member or the elastic member. To be more specific, the second orifice groove is formed such that it is integrally formed in the upper partitioner member at the inner side of the first orifice groove or it is formed integrally in the elastic member.

A mode which forms the second orifice groove in the upper partitioner member may be exemplified by a constitution where a circumferential wall having a U-shaped cross section which opens only downwardly is integrally formed on the inner side of the side face circumferential wall of the first orifice groove. in this case, it is preferable to adopt a constitution where a portion of the elastic member, is interposed between the lower end portion of the periphery of the second orifice groove and the lower partitioner member and is brought into pressure contact with them so as to define a liquid filled portion of the second orifice.

For forming the second orifice groove in the elastic member, a following constitution can be adopted; the elastic member is mounted on the inner side of the circumferential side wall of the first orifice groove, while the second orifice groove of a U-shaped cross section which opens downwardly is disposed close to the inside of this circumferential side wall of the first orifice groove. In this case, both of following structure may be used for the second orifice grooves a structure shown in FIG. 3, in which three faces of the groove except for the lower face is constituted by the elastic member; and a structure shown in FIG. 4 where one outside face of the groove is constituted by the circumferential side wall of the first orifice groove.

The elastic member may be formed of rubber or resin elastomer and in constituted such that the elastic member at least includes an elastic thin film portion for forming the second diaphragm.

As means for securing the elastic member, in addition to a constitution where the elastic member is adhered (adhered by vulcanization) to the lower partitioner member and a constitution where the elastic member is adhered (adhered by vulcanization) to the upper partitioner member, a constitution where the elastic member is clamped by the upper and lower partition members can be also used.

The case in which the elastic member is adhered to the lower partitioner member is exemplified by a mode where an opening is formed at the central portion of the lower partitioner member to assure a space which allows the deformation of the second diaphragm and the second diaphragm has a periphery thereof adhered to the circumferential wall of the opening (see FIG. 5).

The case where the elastic member is adhered to the upper partitioner member may be exemplified by a mode where the elastic member in adhered to the inner side of the circumferential side wall of the first orifice groove by vulcanization, or by a mode where the elastic member is adhered to the inside of the circumferential wall for forming the second orifice.

In case the elastic member is adhered to the upper partitioner member, by forming engaging pawls for temporary assembly on a portion of the lower end portion of the elastic member and forming engaging holes which can be engaged with the engaging pawls on the lower partitioner member, these engaging pawls and engaging holes function as circumferential positioning means between the elastic member and the lower partitioner member.

Furthermore,the case in which the elastic member is clamped between the upper and lower partition members may be exemplified by a mode where a rubber flange is formed on the periphery of the elastic member and where this flange is clamped between the lower end portion of the circumferential wall of the second orifice groove formed on the upper partitioner member and the lower partition member (see FIG. 7).

DETAILED DESCRIPTION OF THE INVENTION

Several embodiments of the present invention are explained in detail hereinafter in conjunction with attached drawings.

The First Embodiment

Figure 1:
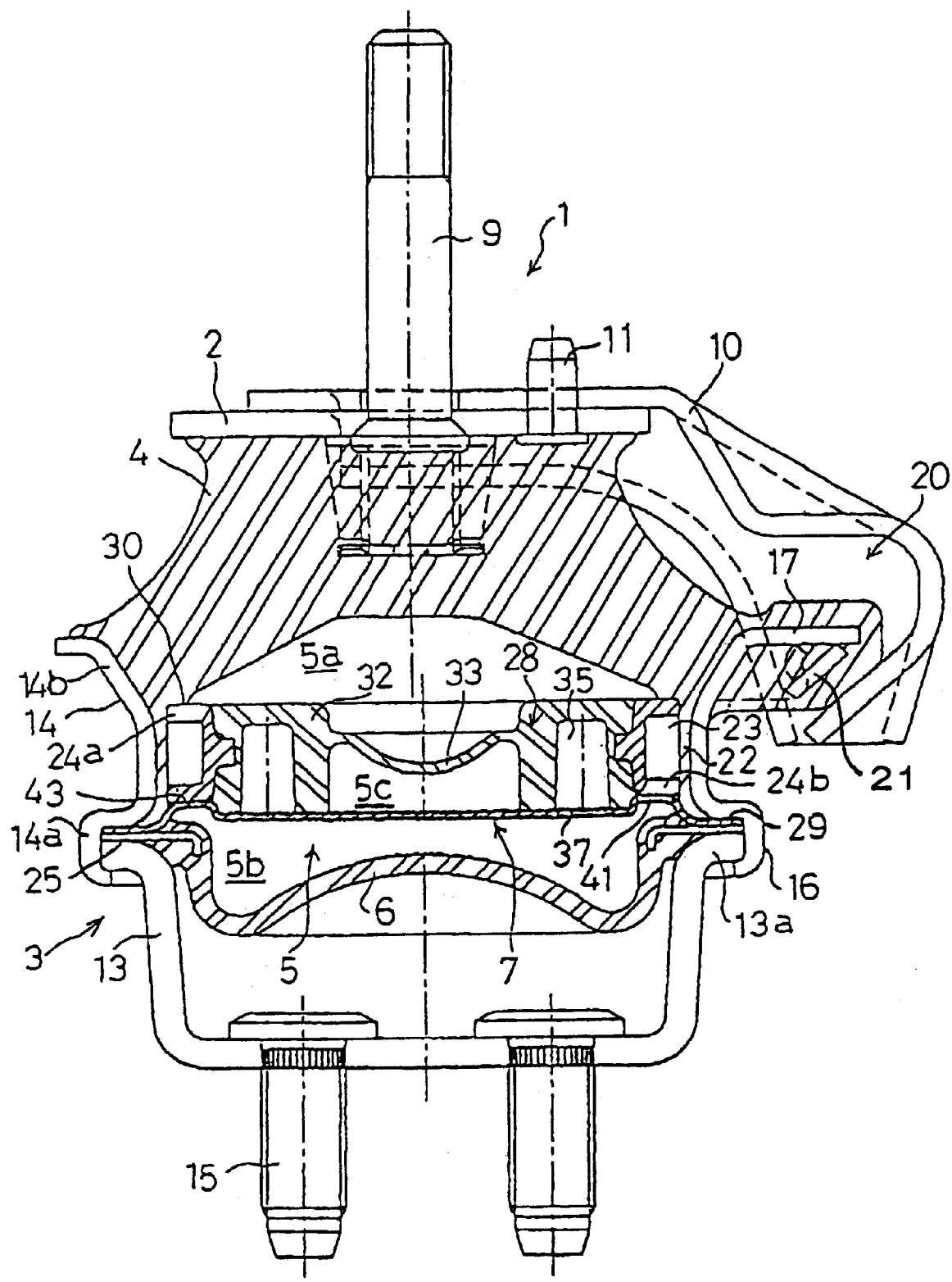
FIG. 1 is across sectional view of a liquid filled vibration isolating device showing the first embodiment of the present invention.
Figure 2:
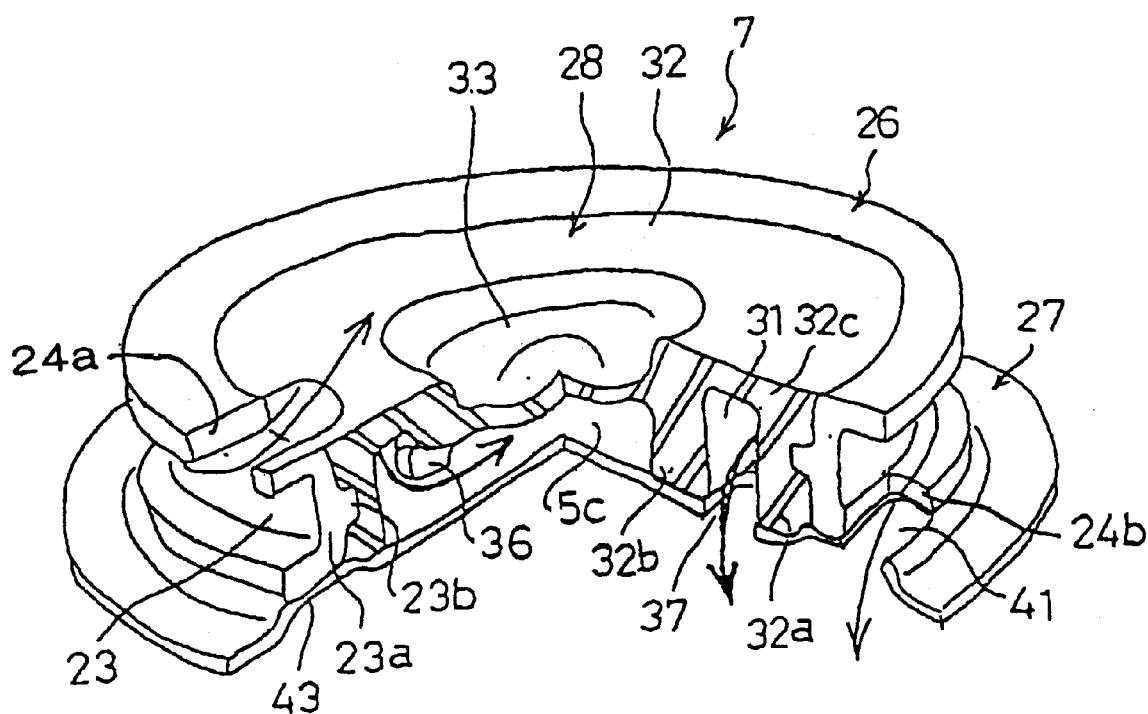
FIG. 2 is a perspective view of a partitioner of the vibration isolating device in the first embodiment.

FIG. 1 is a cross sectional view of a liquid filled vibration isolating device and FIG. 2 is a perspective view of a partitioner. The liquid filled vibration isolating device 1 of this embodiment is comprised of; an upper-side mounting metal fitting 2 which is mounted on a vibration generating body such as an engine directly or indirectly; a lower-side mounting metal fitting 4 which is mounted on a vehicle body directly or indirectly; a vibration isolating base body 4 formed of an elastic material, such as rubber, which connects these fittings 2, 3; a first diaphragm 6 which is mounted on the lower-side mounting metal fitting 3 such that it faces the vibration isolating base body 4 in an opposed manner and defines a liquid chamber 5 between the diaphragm 6 and the vibration isolating base body 4; and a partitioner 7 which divides the liquid chamber 5 into a main liquid chamber 5a and a sub liquid chamber 5b. The partitioner 7 has two orifice grooves 23, 31 and a second diaphragm 33 which will be described later. Due to such a construction, the vibration attenuation function is effected in different frequency bands by these two orifice grooves 23, 31 while the vibration insulation function is effected by the vibration isolating base body 4.

The upper-side mounting metal fitting 2 has a flat plate shape. On the central portion of the upper-side mounting metal fitting 2, a mounting bolt 9 is mounted which is protruded upwardly and supports the engine or the like. Furthermore, on the upper surface of the upper-side mounting metal fitting 2, there is mounted a stopper fitting 10 (a stabilizer fitting) for keeping from a large displacement, which has a rounded, inverted L-shaped cross section extending in a side wise direction. The plate-like mounting portion of the stopper fitting 10 is positioned and fixedly mounted by means of a small bolt 11, on the upper-side mounting metal fitting 2.

The lower-side mounting metal fitting 3 is comprised of; a cylindrical cup (having a shape like a bottom-having cylinder) 13 which includes a radially extending outer flange 13a at an upper end thereof; and a cylindrical drum 14 which has a lower end thereof fastened to the outer flange portion 13a from the outside.

A mounting bolt 15 which is fixedly mounted on the vehicle-body side is fixedly secured to a bottom portion of the cylindrical cup 13. The lower end portion of the cylindrical drum 14 is expanded radially to form a lower end flange 14a. The outer peripheral portion of the first diaphragm 6 and an outer peripheral portion of a lower partitioner member 27 of the partitioner 7 are clamped between the lower end flange 14a and the outer flange 13a of the cylindrical cup 13. A fastening portion 16 is extended from the distal end of the lower end flange 14a. The outer flange 13a of the cylindrical cup 13 is fastened by caulking of the fastening portion 16 in such a manner that the fastening portion 16 having a C-shaped cross section surrounds the outer flange portion 13a from the outside.

The cylindrical drum 14 has an upper portion thereof expanded outwardly in a tapered shape, and a flange 17 which faces a distal end of the stopper fitting 10 and which is provided to only a portion of a ring-like upper edge of the expanded portion 14b. The vibration isolating base body 4 is adhered by vulcanization to the cylindrical drum 14 in such a manner that the vibration isolating base body 4 covers the inner surface of the expanding portion 14b and the outer peripheral portion of the flange 17.

The vibration isolating base body 4 is formed of an elastic material such as rubber in an umbrella shape. The vibration isolating base body 4 has upper and lower portions thereof respectively adhered to the upper-side mounting metal fitting 2 and the cylindrical drum 14 of the lower-side mounting metal fitting 3 by vulcanization. The vibration isolating base body 4 surrounds the flange 17 of the cylindrical drum 14 and is extended to a position facing an inner surface of the distal end of the stopper fitting 10, so as to form a stopper portion 20a for preventing a large displacement so that the stopper portion 20. A reinforcing fitting 21 is embedded in this stopper portion 20 between the flange 17 and the stopper fitting 10. Furthermore, The elastic body that form the vibration isolating body 4 is extended downwardly into the cylindrical drum 14 in a thin film shape until it reaches the lower end of the inner wall of the cylindrical drum 14. The partitioner 7 is pressed in inside the inner circumferential wall of a thin film portion 22.

The first diaphragm 6 includes a flexible, elastic film, and an inner edge of an annular support metal fitting 25 is integrally embedded in the outer peripheral portion of the first diaphragm 6. This support metal fitting 25 is placed on the outer flange 13a of the cylindrical cup 13. This first diaphragm 6, a lower surface of the vibration isolating base body 4 and the thin film portion 22 thereof, defines a liquid chamber 5 as a whole. The partitioner 7 is disposed in the liquid chamber 5 so as to divide the liquid chambers into upper and lower chambers.

As shown in FIG. 1 and FIG. 2, the partitioner 7 is comprised of an upper partitioner member 26, a lower partitioner member 27 and an elastic member 28. The lower, partitioner member 27 has the outer peripheral edge portion thereof extended in a radially outward direction to form an extended edge portion 29. The extended portion 29 is solely fixedly secured to the cylindrical cup 13 of the lower-side mounting metal fitting 3 and the fastening portion 16 of the cylindrical drum 14 by caulking. On the other hand, the upper partitioner member 26 has the outer peripheral portion of the upper end thereof pressed onto a notched shoulder portion 30 having an L-shaped cross section. The notched shoulder portion 30 is formed in an annular shape on the liquid-chamber-side outer peripheral end portion of of the vibration isolating base body 4.

The upper partitioner member 26, which is an annular mold product made of aluminum, has a first orifice groove 23 having a laterally U-shaped cross section that is outwardly opened and circumferentially formed around the upper partitioner member 26. This first orifice groove 23 and the inner circumferential wall of the thin film portion 22 of the vibration isolating base body 4 define a first orifice 24. The first orifice groove 23 has a main liquid-chamber-side inlet/outlet opening 24a on its upper wall and a communicating hole 24b, which is communicated with the sub liquid chamber, on the lower wall of the first orifice groove 23. For-preventing a short-circuiting between the main liquid-chamber-side inlet/outlet opening 24a and the communicating hole 24b, a partition vertical wall 25 (see FIG. 6) is formed such that it clogs the first orifice groove 3.

On the inner-side surface of the side wall 23 of the first orifice groove 23, a protrusion 23b is formed to extend in a circumferential direction, so as to improve the adhesion thereof with the elastic member 28, by vulcanization. It must be noted, however, even without protrusion 23b, the elastic member 28 can be sufficiently secured to the upper partitioner member 26.

The elastic member 28 is made of rubber or resin elastomer, or elastomer plastic, and is formed by integrally molding an orifice portion 32 in which a second orifice groove 31 is formed and a second diaphragm 33 formed of a flexible thin film which is formed in a circular recess form on the main-liquid-chamber side at the inner side of the orifice portion 32, by vulcanization. The outer peripheral portion of the orifice portion 32 is adhered to the inner surface of the first orifice groove's side wall 23a of the upper partitioner member 26.

In the orifice portion 32, the second orifice groove 31 which has an inverted U-shaped cross section and is opened downwardly is formed by approximately concentric circumferential walls 32a, 32b and an annular top wall 32c which covers upper surfaces of these circumferential walls 32a, 32b. By bringing the lower end portions of the circumferential walls 32a, 32b into press-wise contact with the lower partitioner member 27, the second orifice groove. 31 is covered, and,thereby forming a second orifice 35.

This second orifice 35 is communicated with the second sub liquid chamber 5c which is surrounded by the second diaphragm 32 and the lower partitioner member 27 by way of an opening 36 formed in the inner circumferential wall 32b. The second orifice 35 is also communicated with the first sub liquid chamber 5b by means of an opening 37 formed in the lower partitioner member 27. An elastic vertical wall (not shown in drawings) is provided to the second orifice groove 31 for preventing the occurrence of the short circuiting between the second sub-liquid-chamber-side opening 36 formed in the inner circumferential wall 32 and the first sub-liquid-chamber-side opening 37.

The lower partitioner member 27 is made of a metal circular flat plate. While having the function of covering the second orifice groove 31 of the elastic member 28 at the inner side of the upper partitioner member 26 from below, the lower partitioner member 27 is provided with an annular protrusion 43 which is formed by a press molding or the like at the outer peripheral portion thereof, wherein the annular protrusion 43 comes into contact with a lower surface of the upper partitioner member 26 (the lower wall of the first orifice groove) and presses its lower surface upwardly. An opening 41 which is communicated with a communicating opening 24b of the first orifice groove 23 and is opened at the first sub liquid chamber 5b is formed in the protruding portion 43. The lower partitioner member 27 has the outer peripheral portion thereof extended outwardly from the protrusion 43 and an extended portion 29 is fixedly secured by caulking to the fastening portion 16 of the cylindrical cup 13 of the lower-side mounting metal fitting 3 and the cylindrical drum 14.

In assembling the liquid filled vibration isolating device 1 having the above-mentioned constitution, first of all, in the air, the upper partitioner member 26 and the elastic member 28 of the partitioner 7 are adhered to each other by vulcanization. That is, using aluminum or the like, the upper partitioner member 26 having the first orifice groove 23 of a given dimension formed at the periphery thereof is formed by molding, and then the elastic member 28 is adhered by vulcanization to the inside of the groove wall, 23a of the upper partitioner member 26, thus forming the second orifice groove 31 which opens at the sub-liquid-chamber-side and the second diaphragm 33.

Subsequently, the lower-side mounting-metal fitting 3 which is connected to the upper-side mounting metal fitting 2 by way of the vibration isolating body 4 is set in the liquid in such a manner that the lower-side opening of the cylindrical drum 14 thereof is directed upwardly so as to expel inside air. Then, maintaining this condition, the upper partitioner member 26 is pushed into vibration isolating body 4 together with the elastic member 28 along the thin film portion 22 of the vibration isolating body 4 until the outer periphery of the upper end of the upper partitioner member 26 reaches the notched shoulder portion 30 of the vibration isolating body 4. The lower partitioner member 27 is pushed or inserted into vibration isolating body 4 along the fastening portion 16 of the cylindrical portion 14 from above in such a manner that the communication port 24 and the opening 41 are registered or aligned. Then, the annular support fitting 25 of the first diaphragm 6 is pushed or inserted into the fastening portion 16.

These operations are carried out in the liquid. After filling the liquid in the space between the first diaphragm 6 and the vibration isolating base body 4, they are taken out in the atmosphere and then adjustment of the remaining liquid is carried out. Subsequently, the flange portion 13a of the cylindrical cup (or bottom-having sleeve) 13 is fitted into the lower end flange 14a of the cylindrical drum 14 and then this fastening portion 16 is fixedly secured by caulking, thus completing the assembling.

In this manner, by merely fixedly securing the lower partitioner member 27 by caulking, the partitioner 7 is clamped and held between the lower partitioner member 27 and the notched shoulder portion 30 of the vibration isolating base body 4, and the liquid can be filled in the first orifice 24 and the second orifice 35 having given lengths and cross sectional areas, and the vibration isolating device can be easily assembled.

Accordingly, for example, the first orifice 24 can be made thin and long to cope with the shake vibration (10–15 Hz, for example) while the second orifice 35 can be made bold and short to cope with the idle vibration (30–40 Hz).

Particularly, by integrally molding the second orifice groove 31 and the second diaphragm 33 by means of the elastic member 28, the dimension of the elastic member 28 can be readily changed thus it becomes possible to respond to the change of demand values in a short period and at a low cost.

Furthermore, the upper partitioner member 26 to which the elastic member 28 is adhered by vulcanization and the lower partitioner member 27 are separately pressed into or inserted in the liquid vessel and hence, an additional or separate step for fitting the lower partitioner member 27 into the upper partitioner member 26 by pushing or a special tool for expelling entrained residual air which have been necessary in the prior art has become no more necessary so that the assembling steps can be simplified and it becomes possible to provide the highly reliable liquid filled vibration isolating device at a low cost.

Second Embodiment

Figure 3:
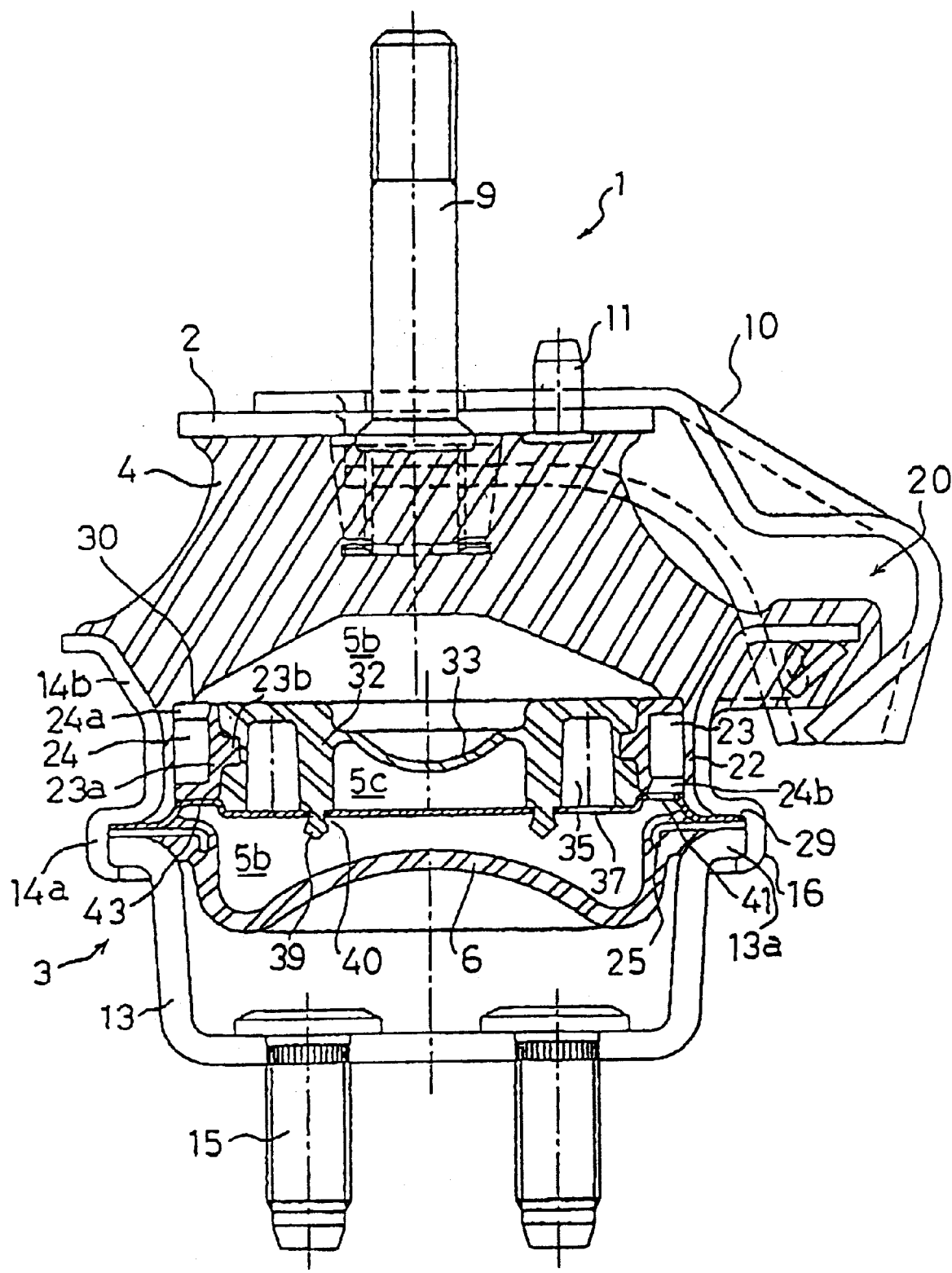
FIG. 3 is a cross sectional view of a liquid filled vibration isolating device showing the second embodiment of the present invention.

FIG. 3 is a cross sectional view of a vibration isolating device showing the second embodiment of the present invention. In this embodiment, elastic engaging pawls 39 for temporary assembling are integrally formed on the lower end of the inner circumferential wall 32b of the elastic member 28 at a plurality of positions. Before inserting the partitioner 7 into the equipment body, these engaging pawls 39 are engaged with a plurality of engaging holes 40 formed in the lower partitioner member 27 so as to accurately carry out positioning of the communicating hole 24b of the upper partitioner member 26 and the sub-liquid-chamber-side opening 41 formed in the lower partitioner member 27.

In this embodiment, before pressing the partitioner 7 into the inside of the liquid chamber of the cylindrical drum 14, the three member constitution consisting of the upper and lower partitioner members 26, 27 and the elastic member 28 which constitutes the partitioner 7 is temporarily assembled, and after they are completely assembled, they are pressed into the liquid chamber of the cylindrical drum 14 and hence, the aligning of the positions of the communication hole 24 of the upper partitioner member 26 and the opening 41 of the lower partitioner member 27 becomes unnecessary. Furthermore, even with this temporary assembled partitioner 7, residual air can be expelled through a gap formed between the upper and lower partition members 26, 27 so that, as in the case of the first embodiment, an additional or separate step for fitting the lower partitioner member 27 into the upper partitioner member 26 and a special tool for expelling entrained residual air become unnecessary other constitutions, manner of operations and effects are as same as those of the first embodiment.

Third Embodiment

Figure 4:
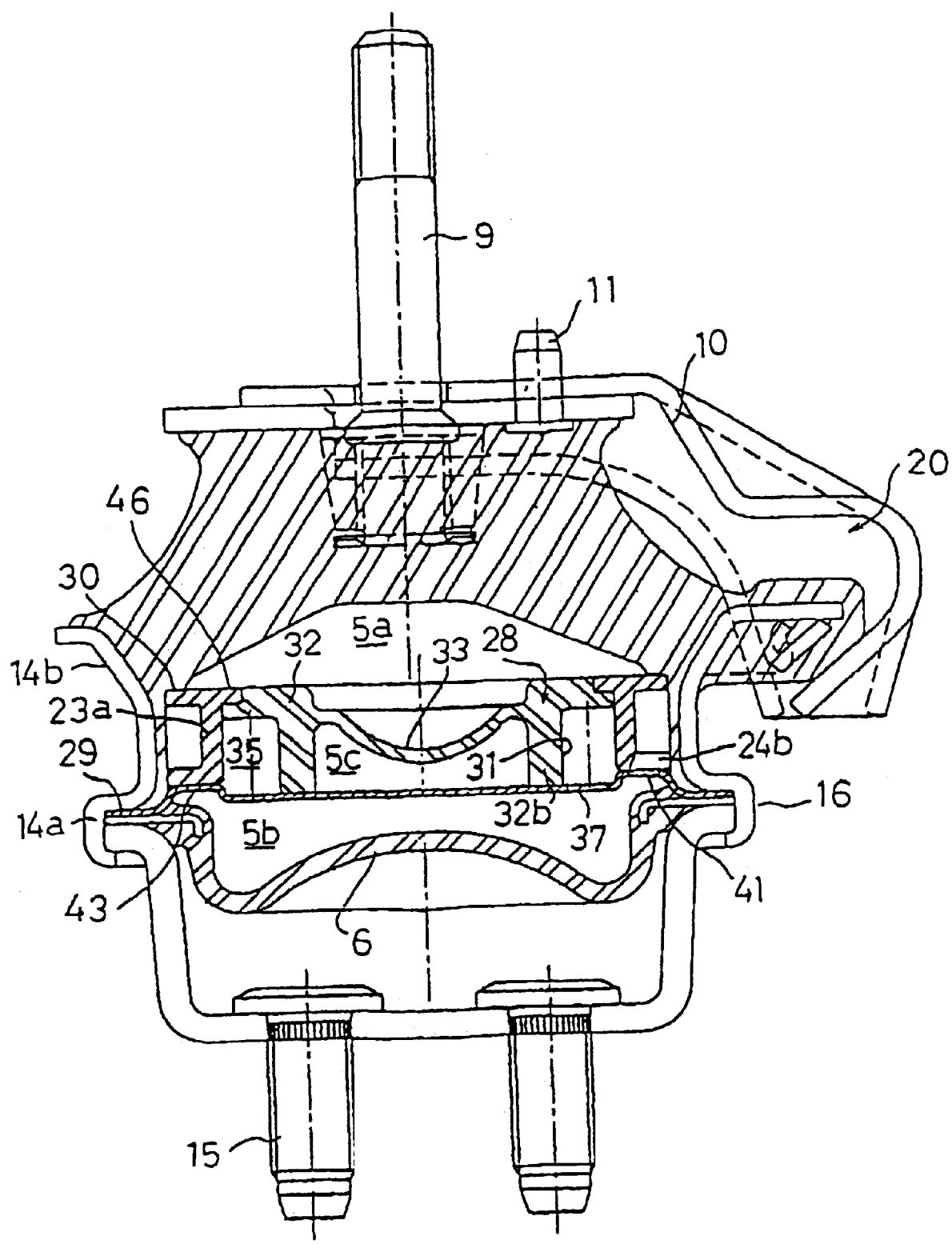
FIG. 4 is a cross sectional view of a liquid filled vibration isolating device showing the third embodiment of the present invention.

FIG. 4 is a cross sectional view showing the third embodiment of the present invention. In this embodiment, constitutions which differ from the first embodiment are that the second orifice 35 is defined by three members, that is, the inner side wall surface of the side groove wall 23a of the first orifice groove 23, the orifice groove 31 of an L-shaped cross section formed in the outer peripheral side of the elastic member 28 and the lower partitioner member 27 of a flat plate shape. In this manner, different from the first embodiment, the outer circumferential wall 32a is omitted from the, elastic member 28 and the groove wall 23b of the first orifice groove 23 is used in place of the outer circumferential wall 32a.

Furthermore, the protrusion 23b is omitted from the inner surface of the groove wall 23a of the first orifice groove 23 and, in place of this protrusion 23b, for preventing the elastic member 28 from being removed upwardly, an inner flange 46 is formed on the upper end of the groove wall 23a. Since the elastic member 28 is adhered to the upper partitioner member 26 by vulcanization, the elastic member 28 can be sufficiently adhered even when the inner flange 46 is not provided. Other constitutions, manner of operations and effects are as same as those of the first embodiment.

Fourth Embodiment

Figure 5:
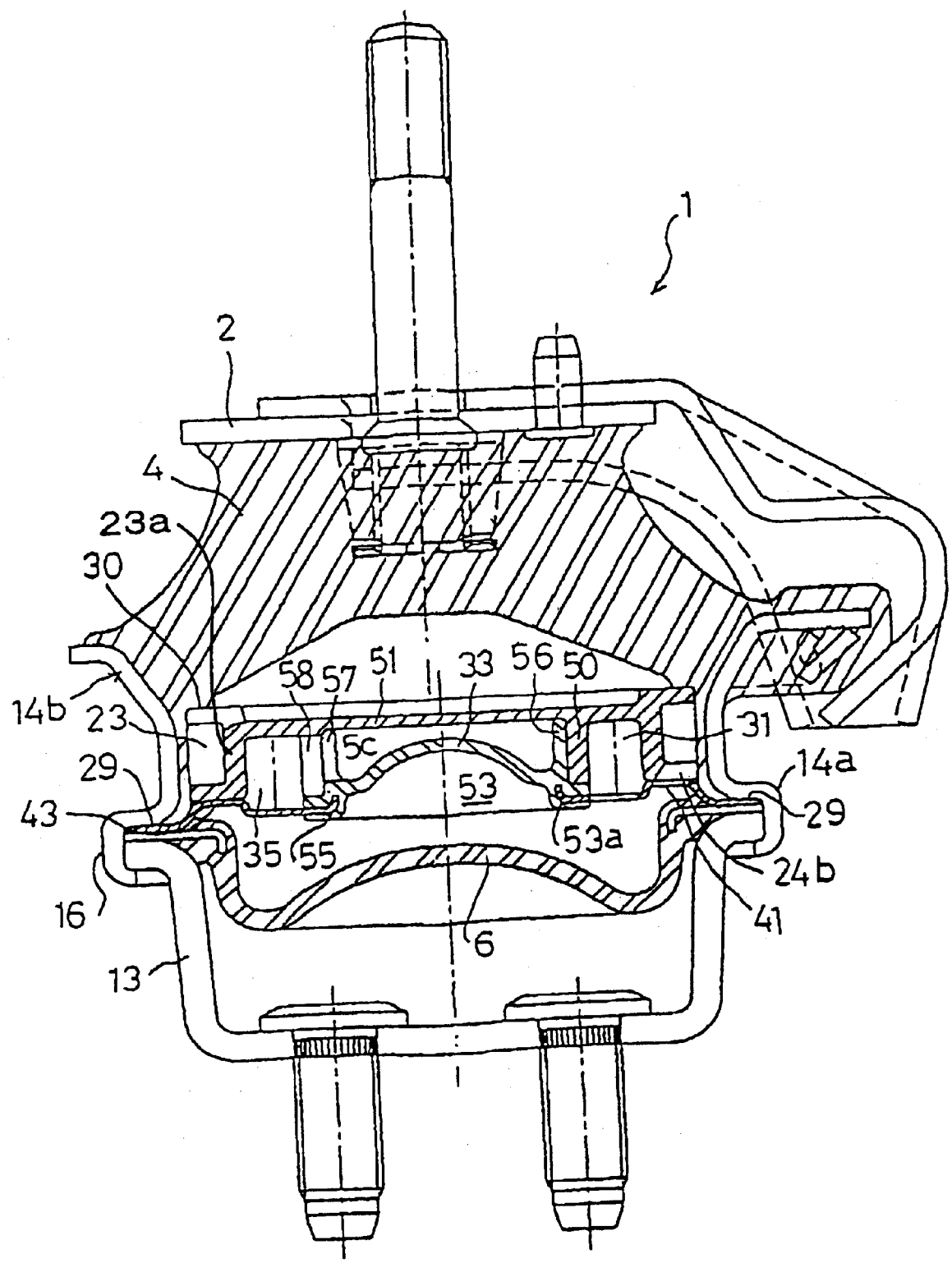
FIG. 5 is a cross sectional view of a liquid filled vibration isolating device showing the fourth embodiment of the present invention.
Figure 6:
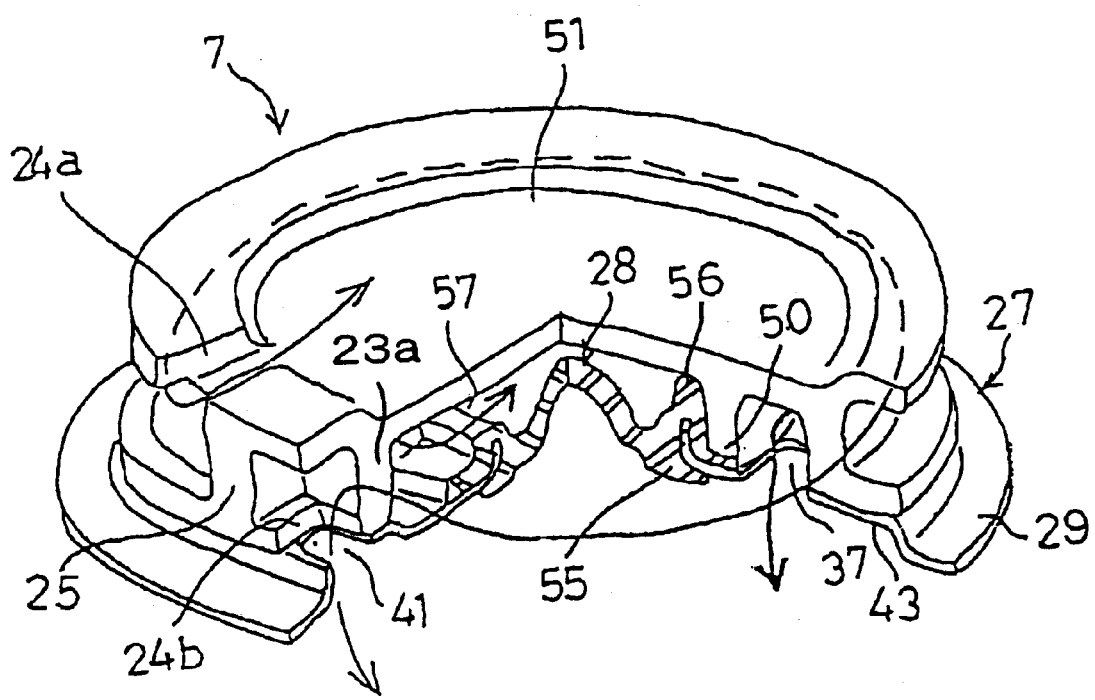
FIG. 6 is a perspective view of a partitioner of the liquid filled vibration isolating device in the fourth embodiment.

FIG. 5 is a cross sectional view of a vibration isolating device showing the fourth embodiment of the present invention and FIG. 6 is a perspective view of a partitioner thereof. The partitioner 7 of this embodiment has the common constitution with the first embodiment on a point that the partitioner 7 has a three member constitution consisting of the upper partitioner member 26, the lower partitioner member 27 and the elastic member 28; on a point that only the outer peripheral portion of the upper partitioner member 26 is pressed onto the notched shoulder portion 30 of the vibration isolating base body 4; and on a point that only the extended portion 29 of the lower partitioner member 27 is fixedly secured by caulking. The partitioner 7 of this embodiment substantially differs from the first embodiment on a point that the second orifice groove 31 is formed in the upper partitioner member 26; and on a point that the elastic member 28 is adhered to the lower partitioner member 27 by vulcanization. Since the constitutions other than this partitioner 7 are as same as those of the first embodiment, the explanation thereof is omitted.

The upper partitioner member 26 is a molded product made of aluminum. The first orifice groove 23 having a laterally U-shaped cross section, which is outwardly opened (which has a peripheral side portion opened), is formed in the upper partitioner member 26 to extend in a circumferential direction. An upper faceplate 51 which covers an upper face disposed inwardly from the annular side wall 23a of the first orifice groove 23 is integrally formed with the annular sidewall 23a. Furthermore, an annular circumferential wall 50 which is disposed inwardly from the annular side groove wall 23a is integrally formed with the annular side wall 23a. Due to this circumferential wall 50, the upper face plate 51 and the annular side wall 23a, the second orifice groove 31 having a U-shaped cross section which is opened downwardly is formed in the upper partitioner member 26.

On the other hand, the lower partitioner member 27 is made of an annular flat plate member having a central opening 53 at the central portion thereof, wherein the central opening 53 opens at the sub-liquid-chamber side. The brim portion of the central opening 53 is bent upwardly and the elastic member 28 is adhered to an opening brim portion 53a which includes this bent portion by vulcanization. The constitution of the outer peripheral extended portion 29 and the outer peripheral protruding portion 43 of the lower partitioner member 27 are as same as those of the first embodiment.

The elastic member 28 is comprised by a second diaphragm 33 formed in an arcuate concave form at the sub-liquid-chamber side; a sealing thick portion 55 which is adhered by vulcanization to an opening brim of the lower partitioner member 27 in grasping manner and which has an upper-face-side portion thereof elastically inserted between the lower end of the inner circumferential wall 50 of the upper partitioner member 26 and the upper face of the lower partitioner member 27; and an annular guide portion 56 which functions as a guide for fitting the elastic member 28 into the inner face side of the circumferential wall 50 by pressing in and has an opening at a portion thereof. These members 33, 27 and 56 are integrally formed in the elastic member 28.

By fitting the annular guide portion 56 of the elastic member 28 into the inside of the circumferential wall 50 of the upper partitioner member 26, a space surrounded by the second diaphragm 33 and the upper face plate 51 of the upper partitioner member 26 is defined as the second sub liquid chamber 5c and this second sub liquid chamber 5c is communicated with the second orifice 35 by way of communication holes 57, 58 formed in the circumferential wall 50 and the annular guide portion 56.

In assembling the vibration isolating device 1 having the above-mentioned constitution, first of all, the upper partitioner member 26 and the lower partitioner member 27 to which the elastic member 28 is adhered by vulcanization are assembled in the atmosphere. In this case, the guide portion 56 is fitted into the inside of the circumferential wall 50 of the upper partitioner member 26 thus completing a temporary assembling such that the communication hole 24b of the first orifice groove 23 and the sub-liquid-chamber-side opening 41 of the lower partitioner member 27 take given positions.

Then, in the liquid vessel, while setting the equipment body with the lower end open portion of the cylindrical drum 14 in an up-side-down posture, the partitioner 7 is pushed into the vibration isolating base body 4 along the thin film portion 22, then the first diaphragm 6 is pressed into the vibration isolating body 4, and they are taken out from the liquid to the atmosphere, and after adjusting the remaining liquid, they are fixedly secured to each other at the fastening portion 16 thus completing the assembling.

In this manner, by integrally molding two orifice grooves 23, 31 in the upper partitioned member 26, the groove dimensions which determine the set frequency bands respectively can be maintained in a stable manner thus providing a highly reliable vibration isolating device.

Furthermore, although the upper and lower partition members 26, 27 are temporarily assembled, residual air can be expelled through a gap formed between the upper and lower partition members 26, 27 so that, an additional or separate step for fitting the lower partitioner member 27 into the upper partitioner member 26 and a special tool for expelling entrained residual air become unnecessary.

Fifth Embodiment

Figure 7:
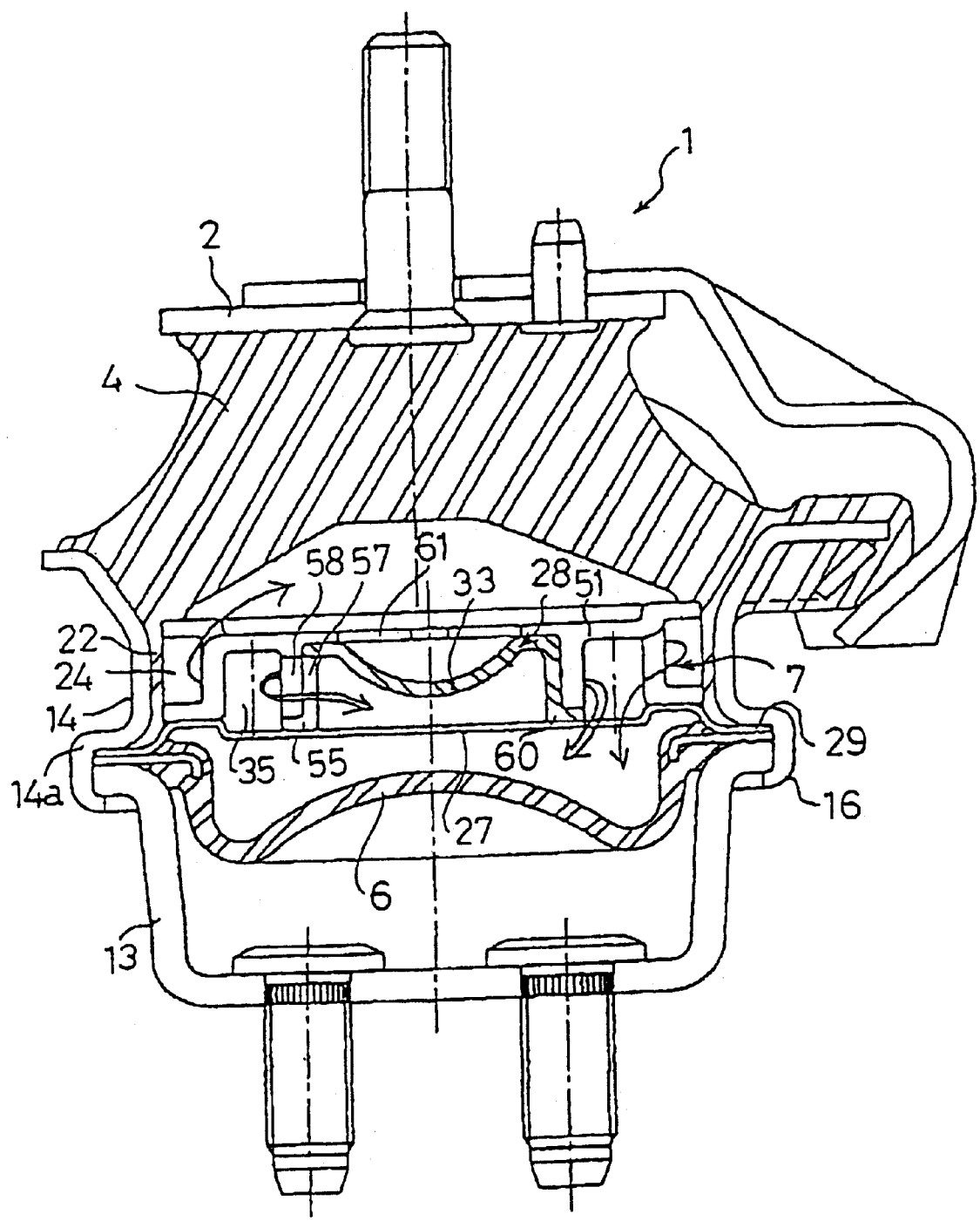
FIG. 7 is a cross sectional view of a liquid filled vibration isolating device showing the fifth embodiment of the present invention.
Figure 8:
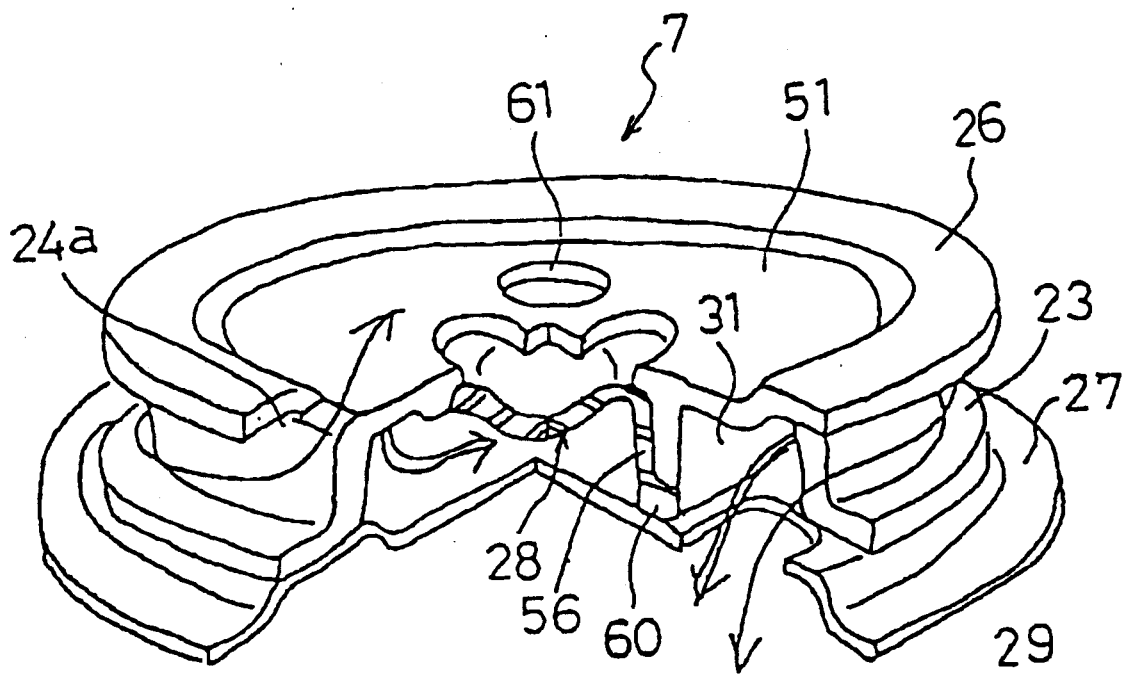
FIG. 8 is a perspective view of a partitioner of the liquid filled vibration isolating device in the fifth embodiment.

FIG. 7 is a cross sectional view of the vibration isolating device of the fifth embodiment and FIG. 8 is a perspective view of the partitioner thereof. The partitioner 7 of this embodiment differs from that of the fourth embodiment on a point that the elastic member 28 is adhered by vulcanization to neither one of the upper and lower partition members 26, 27 and it is clamped between the upper and lower partition members 26, 27.

That is, in the partitioner 7 of this embodiment, the lower partitioner member 27 has the same constitution as that of the first embodiment, while the upper partitioner member 26 is constructed such that a plurality of through holes 61 are formed in the top face plate 51 of the fourth embodiment so that the sub liquid chamber is communicated with the main liquid chamber side.

The elastic member 28 is molded by vulcanization alone and then has a lower end outer peripheral flange rubber portion 60 thereof sandwiched or clamped between the lower end of the circumferential wall 50 of the upper partitioner member 26 and the flat portion of the lower partitioner member 27. This elastic member 28 is formed by integrally molding the second diaphragm 33 molded in an arcuate concave shape at the main liquid chamber a side, a sealing flange rubber 60 which is elastically interposed between the lower end of the inner side circumferential wall 50 of the upper partitioner member 26 and the upper face of the lower partitioner member 27, and the annular guide 56 which functions as a guide for fitting the elastic member 28 into the inner side of the circumferential wall 50 by pushing and has an opening 57 at a portion thereof.

In assembling, this elastic member 28 is fitted into the circumferential wall 50 of the upper partitioner member 26 thus completing the temporary assembling. Subsequently, in the same manner as the first embodiment, in the liquid vessel, the upper partitioner member 26 is pushed into the equipment body, and then the lower partitioner member 27 is inserted, and then the first diaphragm 6 is inserted. Subsequently, they are taken out into the atmosphere and the extended portion 29 of the lower partitioner member 27 is fixedly secured by caulking. In this embodiment, an additional or separate step for fitting the lower partitioner member 27 into the upper partitioner member 26 and a special tool for expelling entrained residual air become unnecessary as in the case of the above-mentioned fourth embodiment.

The point which features the above-mentioned constitution is that the elastic member 28 is clamped by the upper and lower partitioner members 26, 27 and hence, the constitution which is hardly affected by the irregularities of dimensions or the deterioration of the rubber which may be caused as time lapses can be obtained.

As has been described heretofore, according to the present invention, the partitioner has a three member constitution consisting of the upper partitioner member, the lower partitioner member and the elastic member, and the outer peripheral end portion of the lower partitioner member is radially outwardly extended and only an extended portion is fixedly secured to a mounting metal fitting of a vibration isolating device body by caulking, and the upper end outer peripheral portion of the upper partitioner member is pushed to the liquid chamber side outer peripheral end portion of the vibration prevention base body and is positioned and hence, the liquid filled vibration isolating device can be assembled easily. Furthermore, a vibration isolating device which can assuredly expel the entrained air around the partitioner before assembling parts or components can be provided.

What is claimed is:

1. A liquid filled vibration isolating device having a main liquid chamber and a sub liquid chamber disposed between a vibration isolating base body and a first diaphragm and having a partitioner disposed between the main liquid chamber and a sub liquid chamber to separate them, said partitioner comprises:

an upper partitioner member having a first orifice groove of a laterally U-shaped cross section opened outwardly;

a lower partitioner member of a flat plate shape covering a second orifice groove which is formed at the inner side of said upper partitioner member and is opened downwardly;

an elastic member which has a second diaphragm and is disposed inside of said upper partitioner member; and an outwardly extended portion extended outwardly in a radial direction from an outer peripheral end portion of said lower partitioner member, and said outwardly extended portion solely being caulked with and fixedly secured to a mounting metal fitting attached with said vibration isolating base body or said first diaphragm so that an upper end outer peripheral portion of said upper partitioner member is pressed onto a liquid-chamber-side outer peripheral portion of said vibration isolating base body to enclose a liquid of the main liquid chamber or the sub liquid chamber.

2. A liquid filled vibration isolating device according to claim 1, wherein said second orifice groove is integrally formed with said upper partitioner member at a position more inward than said first orifice groove.

3. A liquid filled vibration isolating device according to claim 1, wherein said second orifice groove is formed in said elastic member.

4. A liquid filled vibration isolating device according to claim 1, 2 or 3, wherein said elastic member is adhered to said lower partitioner member.

5. A liquid filled vibration isolating device according to claim 1, 2 or 3, wherein said elastic member is adhered to said upper partitioner member.

6. A liquid filled vibration isolating device according to claim 5, said partitioner further comprises a circumferential positioning means for circumferential-direction-wisely positioning said elastic member with respect to said lower partitioner member, said circumferential positioning means being comprised of engaging pawls molded at a lower end portion of said elastic member and engaging holes formed in said lower partitioner member such that said engaging holes are capable of being engaged with said engaging pawls on beforehand.

7. A liquid filled vibration isolating device according to claim 1, 2 or 3, wherein said elastic member is clamped between said upper and lower partition members.

8. A liquid filled vibration isolating device according to claim 1, 2 or 3, wherein a portion of said elastic member is brought into pressed-wise contact with said lower partitioner member thus forming a liquid sealing portion of said second orifice groove.

9. A liquid filled vibration isolating device according to claim 1, 2 or 3, wherein said upper partitioner member is a molded product made of aluminum.

10. A liquid filled vibration isolating device according to claim 1, 2 or 3, wherein said upper partitioner member is a molded product made of synthetic resin.

11. A liquid filled vibration isolating device according to any one of claims 1–3, wherein a protrusion which presses said upper partitioner member upwardly is formed on an outer peripheral portion of said lower partitioner member.

* * * * *